(12) United States Patent
Horner

(10) Patent No.: US 11,428,367 B2
(45) Date of Patent: Aug. 30, 2022

(54) BIAXIALLY ORIENTED BLOW-MOLDED PRESSURE VESSELS

(71) Applicant: ENPRESS LLC, Eastlake, OH (US)

(72) Inventor: Douglas M. Horner, Gates Mills, OH (US)

(73) Assignee: ENPRESS LLC, Eastlake, OH (US)

( * ) Notice: Subject to any disclaimer, the term of this patent is extended or adjusted under 35 U.S.C. 154(b) by 181 days.

(21) Appl. No.: 16/967,635

(22) PCT Filed: Feb. 5, 2019

(86) PCT No.: PCT/US2019/016578
§ 371 (c)(1),
(2) Date: Aug. 5, 2020

(87) PCT Pub. No.: WO2019/156943
PCT Pub. Date: Aug. 15, 2019

(65) Prior Publication Data
US 2021/0276239 A1    Sep. 9, 2021

Related U.S. Application Data

(60) Provisional application No. 62/627,235, filed on Feb. 7, 2018.

(51) Int. Cl.
*F17C 1/00* (2006.01)
*B29C 49/12* (2006.01)
(Continued)

(52) U.S. Cl.
CPC ............... *F17C 1/00* (2013.01); *B29C 49/12* (2013.01); *B29K 2101/12* (2013.01);
(Continued)

(58) Field of Classification Search
CPC . F17C 1/005; F17C 1/00; B29C 49/12; B29C 49/10; B29C 49/08; B29C 49/4273; B29C 55/26
(Continued)

(56) References Cited

U.S. PATENT DOCUMENTS 3,949,033 A    4/1976  Uhlig
4,042,657 A *  8/1977  Ostapchenko .......... B29C 49/78
                                                    264/40.1
(Continued)

FOREIGN PATENT DOCUMENTS

JP    59002818 A  *  1/1984  ............. B29C 49/18
JP    63076993 A  *  4/1988  ............. F17C 13/123

OTHER PUBLICATIONS

International Search Report dated Apr. 15, 2019 filed in PCT/US2019/016578.

*Primary Examiner* — Robert J Hicks
(74) *Attorney, Agent, or Firm* — Rankin, Hill & Clark LLP

(57) ABSTRACT

A method of manufacturing a pressure vessel that includes heating a preform formed of a thermoplastic polymer, inserting a blow pin assembly that includes a bung portion and a plunger portion into an opening of the heated preform, clamping the heated preform between the bung portion and sections of a blow mold, extending the plunger portion into an interior of the heated preform to stretch the heated preform in the blow mold, and blowing air into the stretched preform under pressure to form the pressure vessel such that: (a) the pressure vessel includes a tank having a neck portion, a cylindrical body portion having a diameter of at least about 200 mm, and a bottom portion, (b) at least the thermoplastic polymer in the cylindrical body portion is biaxially oriented,
(Continued)

and (c) threads are formed in the neck portion. Also a pressure vessel formed in accordance with the method.

31 Claims, 2 Drawing Sheets

(51) Int. Cl.
*B29K 101/12* (2006.01)
*B29L 31/00* (2006.01)

(52) U.S. Cl.
CPC ............... *B29L 2031/7156* (2013.01); *F17C 2201/0104* (2013.01); *F17C 2209/2127* (2013.01)

(58) Field of Classification Search
USPC ..................... 264/532, 534, 531; 220/581
See application file for complete search history.

(56) References Cited

U.S. PATENT DOCUMENTS

| | | | | |
|---|---|---|---|---|
| 4,234,302 | A | * | 11/1980 | Valyi ................ B29C 49/20 264/537 |
| 4,442,063 | A | | 4/1984 | Younkin et al. |
| 5,085,822 | A | * | 2/1992 | Uehara ................ B29C 49/66 264/528 |
| 5,681,520 | A | | 10/1997 | Koda et al. |
| 7,658,882 | B2 | * | 2/2010 | Minganti ............. B29C 51/02 425/529 |
| 2015/0027088 | A1 | | 1/2015 | Miyahara et al. |
| 2017/0021553 | A1 | | 1/2017 | Kharchenko et al. |
| 2019/0168438 | A1 | * | 6/2019 | Morikami .............. B29C 49/06 |

* cited by examiner

BIAXIALLY ORIENTED BLOW-MOLDED PRESSURE VESSELS

CROSS-REFERENCE TO RELATED APPLICATIONS

The present application claims priority to U.S. Provisional Patent Application Ser. No. 62/627,235, filed Feb. 7, 2018, which is incorporated herein by reference.

BACKGROUND

Conventional injection molded pressure vessels and blow molded pressure vessels are formed of thermoplastic materials. However, conventional injection molded thermoplastic materials and blow molded thermoplastic materials do not produce parts that both: (a) exhibit both cyclic and pressure capabilities; and (b) have predictable and safe failure modes.

For instance, injection molded sump filters, used for water treatment for example, work well under pressure and fairly well under cyclic conditions, but can exhibit violent failure modes when an internal overpressure of the vessels produces uncontrollable ruptures of the vessel, with sharp shards scattering outward in a large radius. Conventional blow molded pressure vessels can work under lower pressure ranges and also exhibit good cyclic properties, but like injection molded pressure vessels, can exhibit violent failure modes producing uncontrollable ruptures, with sharp shards scattering outward in a large radius.

Other drawbacks of these two types of unreinforced pressure vessels is that their performance capabilities are limited by the properties of the material (i.e. tensile strength & creep properties) used to form the pressure vessels. Known ways to address some of these disadvantages include increasing the wall thickness of the pressure vessels or reinforcing the thermoplastic material with, for example, a composite layer formed of a winding of fiberglass that is coated with an epoxy material. However, these known solutions necessarily require more material to be used to make the pressure vessels, and thereby increase manufacturing costs and make manufacturing of the pressure vessels more difficult.

BRIEF DESCRIPTION

According to one aspect, a method of manufacturing a pressure vessel includes:
heating a preform formed of a thermoplastic polymer;
inserting a blow pin assembly into an opening of the heated preform, wherein the blow pin assembly includes a bung portion and a plunger portion that extends through the bung portion;
clamping the heated preform between the bung portion of the blow pin assembly and sections of a blow mold;
extending the plunger portion of the blow pin assembly into an interior of the preform from a first retracted position to a second extended position to thereby stretch the heated preform in the blow mold; and
blowing air into the stretched preform under pressure to thereby form the pressure vessel such that:
  (a) the pressure vessel comprises a tank having a neck portion, a cylindrical body portion having a diameter of at least about 200 mm, and a bottom portion,
  (b) at least the thermoplastic polymer in the cylindrical body portion of the pressure vessel is biaxially oriented, and
  (c) threads are formed in the neck portion of the pressure vessel.

In a preferred embodiment, a pressure vessel includes a tank portion defining an interior of the pressure vessel; and a neck portion defining an opening to the interior, and including a female thread at the opening. The female thread, the neck portion, and the tank are integrally formed from a polymer material and the polymer material is biaxially oriented.

The foregoing and other features of the invention are hereinafter more fully described below, the following description setting forth in detail certain illustrative embodiments of the invention, these being indicative, however, of but a few of the various ways in which the principles of the present invention may be employed.

DETAILED DESCRIPTION

The present invention is directed to the production method of large unreinforced pressure vessels that exhibit both cyclic and pressure capabilities, while having predictable and safe failure modes. The vessels are made from polymer materials that, at least on some sections, have a biaxial molecular orientation. The biaxial molecular orientation of the molded part produces an increase in ductile properties, increased impact capabilities, and reduces the wall thickness required for a particular pressure rating for the vessel as compared to conventional injection or blow molded pressure vessels. Because of these improved performance properties, the pressure vessels may not require reinforcement, for example, in the form of a fiberglass/epoxy composite layer applied over the outer surface of the pressure vessel. Such pressure vessels may be used for water treatment, among other applications.

Figure 1:
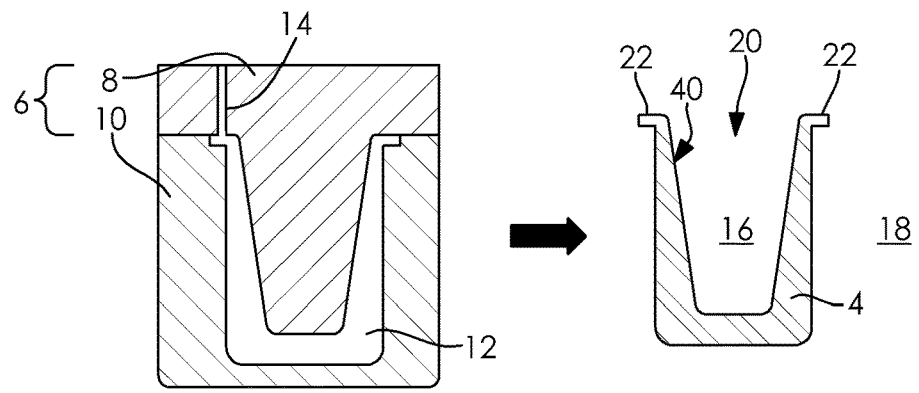
FIG. 1 is a cross-sectional view of an injection mold and a preform formed in the injection mold according to the present subject matter.

In order to form a pressure vessel according to the invention as schematically illustrated in FIGS. 2-6, one must first obtain a suitable preform 4. The preform 4 can be formed by injection molding. With reference to FIG. 1, the injection molding process may utilize an injection mold 6 including a first mold portion 8 and a second mold portion 10. When mated, the first and second molded portions 8, 10 form a cavity 12 into which a polymer material in liquid form (e.g. melted) can be fed via a sprue 14 in the mold 6.

The polymer material used for injection molding the preform 4 may include Low Density Polyethylene (LDPE), High Density Polyethylene (HDPE), Polypropylene (PP), Polyvinyl Chloride (PVC), Polyethylene Terephthalate (PET), Polycarbonate (PC), Nylon 6, Acrylonitrile-Butadiene-Styrene (ABS), other thermoplastic polymers, and combinations thereof. The polymer material may include fillers or other additives as desired for enhancing a particular property of the molten polymer material, of the preform 4, and/or of the final pressure vessel 2.

The molten polymer material may be fed through the sprue 14, fill up the cavity 12, and then be solidified inside the cavity 12 (e.g. by cooling), thus forming the solid preform 4 having a shape determined by the shape of the cavity 12. Due to the injection molding process, the polymer material in the preform 4 may be monoaxially oriented.

The preform 4 may be smaller than the final pressure vessel 2, e.g. 200% to 300% smaller than the final pressure vessel 2. The preform 4 may have varying wall thicknesses (see FIGS. 1-3) in order to allow the preform 4 to be expanded in a subsequent blow molding process and thereby provide a uniform wall thickness to the final pressure vessel 2. The thicker walls at the bottom of the preform 4 may be expanded more than at the top of the preform 4. With this in mind, the varying wall thickness in the preform 4 may thereby allow the pressure vessel 2 to have uniform wall thicknesses over the entire pressure vessel 2 (see FIGS. 5-6).

As depicted in the figures, the bottom of the preform 4 has thicker walls than the top of the preform 4, while the pressure vessel 2 may then have uniform wall thickness. These depictions of the preform 4 and pressure vessel 2 are merely included for convenience to aid in the understanding of the invention, but are not necessarily meant to be to scale and may not accurately depict the actual size, shape, and wall thicknesses of the preform 4 and the pressure vessel 2 made according to the present subject matter. In this regard, it should be understood that preforms 4 and pressure vessels 2 having any shape, size, and wall thickness may be produced and used in accordance with the present subject matter, and the present subject matter is not limited to the shape, size, and wall thicknesses of the preform 4 and pressure vessel 2 as depicted in the figures, and other shapes, sizes, and varying wall thicknesses may be used.

As shown in FIG. 1, the preform 4 may define an interior 16, an exterior 18, and an opening 20 providing access between the interior 16 and the exterior 18. A lip 22 may be formed around and edge of the opening 20 and may extend outward from the opening 20.

The preform 4 can be injection molded in advance and stored for later use in forming a pressure vessel or it can be formed in an injection molding station immediately prior to the preform being blown into a pressure vessel. In the latter circumstance, the preform 4 must be cooled to a first predetermined temperature after it is formed by injection molding. This cooling step may be performed within the cavity 12 of the mold 6, or may be performed after the preform 4 is removed from the cavity 12. Cooling may be active (subjecting the preform 4 or mold 6 to a cooling agent, e.g. air, liquid, or heat sink) or passive (simply letting the preform 4 or mold 6 cool in the ambient environment). The first predetermined temperature is a temperature that allows for the preform 4 to be handled outside the cavity 12 without significant deformation of the preform 4. The first predetermined temperature may be below the glass transition temperature ($T_g$) of the polymer material used to make the preform 4, and is therefore dependent on the chemical composition of the polymer material used to form the preform 4.

In accordance from with the invention, the preform 4 is heated in a heating station 24 to a temperature suitable for blow molding. The temperature (sometimes referred to herein as a second predetermined temperature) may be at or above the $T_g$, and below the melting temperature ($T_m$) of the polymer material of the preform 4, and is therefore dependent on the chemical composition of the polymer material used to form the preform 4. The second predetermined temperature is a temperature that allows for the preform 4 to be at least partially deformed while maintaining some of the structure of the preform 4, but without completely melting the preform 4. Suitable temperatures are known in the art.

Figure 2:
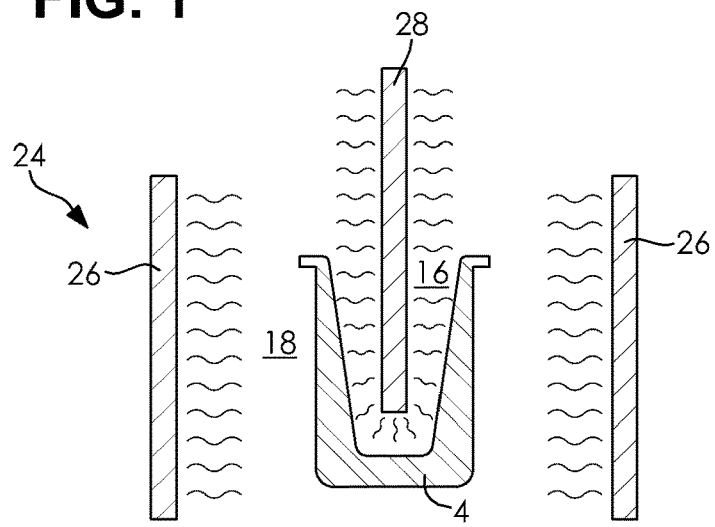
FIG. 2 is a cross-sectional view of a heating process used to heat a preform according to the present subject matter.

The heating station 24 may include external heating elements 26 that are arranged at, and heat the preform 4 from, the exterior 18. The heating station 24 may also include an internal heating element 28 that is arranged in, and heats the preform 4 from, the interior 16. The heating station 24 is not limited to the number, configuration, or arrangement of heating elements 26, 28 as depicted in FIG. 2; and other heating elements, including a different number, different configurations, and different arrangements of heating elements may be used. For example, an additional heating element may be arranged below the preform 4 to heat a bottom of the preform 4. The heating elements 26, 28 are not particularly limited, and may include any conduction, convection, or radiant heat sources, including infrared heating elements, lasers, ovens, ultrasonic heating elements, etc. The preform 4 may be arranged in the heating station 24 by being suspended (e.g. by the lip 22), or by placing the preform 4 on a platform. Preferably, the preform 4 is heated in the heating station 24 to the second predetermined temperature so as to allow the preform 4 to be expanded in the subsequent blow molding step to form the pressure vessel 2.

Figure 3:
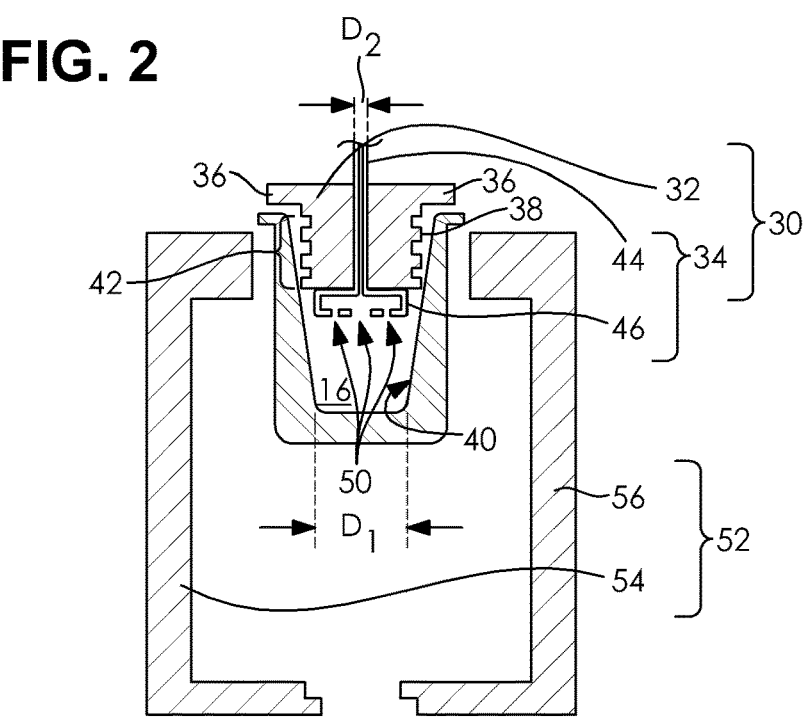
FIG. 3 is a cross-sectional view of a blow-pin assembly being inserted into an opening of a heated preform and a blow mold about to clamp the heated preform between the blow pin assembly and the blow mold according to the present subject matter.
Figure 4:
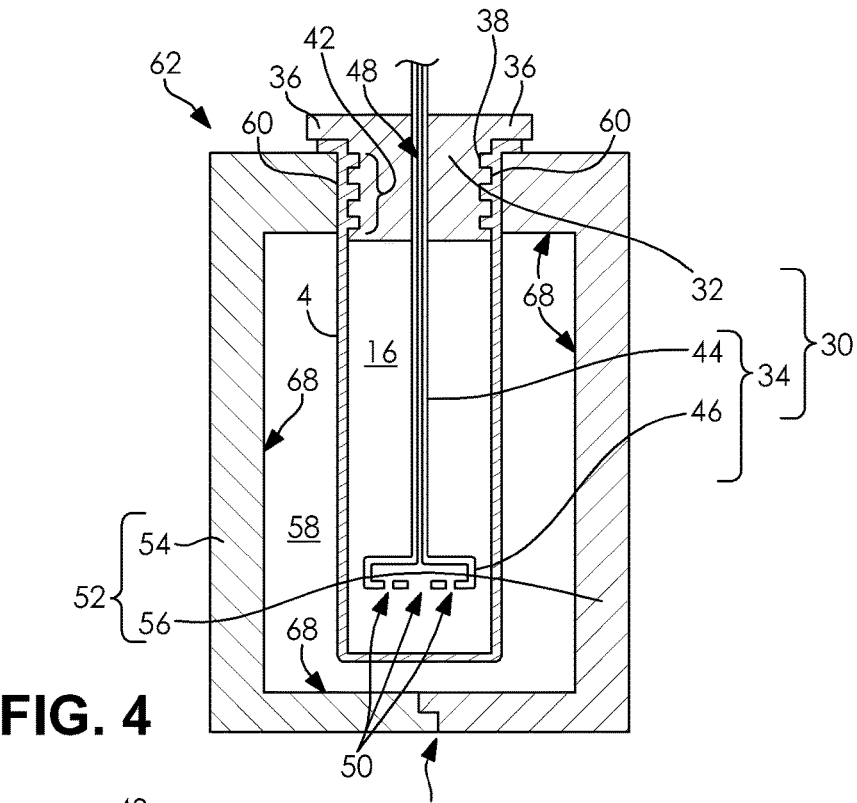
FIG. 4 is a cross-sectional view of a plunger stretching a heated preform in a blow mold according to the present subject matter.

With reference to FIGS. 3 and 4, the method includes inserting a blow pin assembly 30 into the opening 20 of the preform 4. The blow pin assembly 30 may include a bung portion 32 and a plunger portion 34. The plunger portion 34 may extend through the bung portion 32, and the plunger portion 34 may be moveable with respect to the bung portion 32. For example, the plunger portion 34 may be moved up and down with respect to the bung portion 32 as shown between FIGS. 3 and 4, between a first retracted position (FIG. 3) to a second extended position (FIG. 4).

Figure 5:
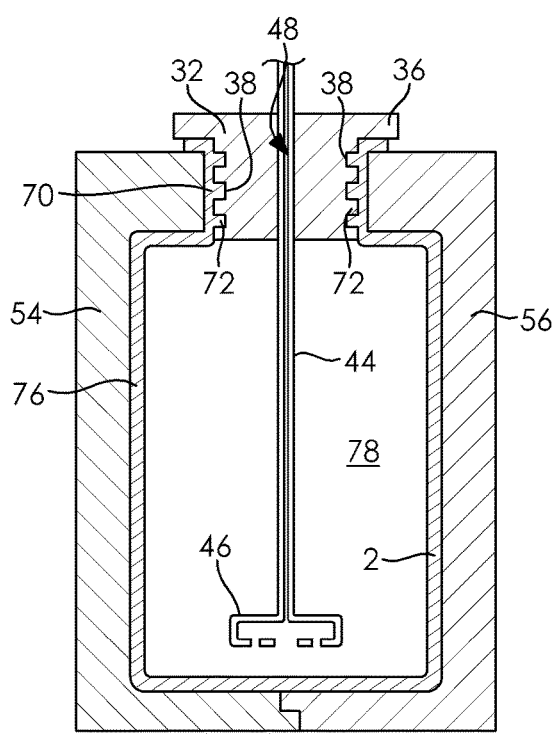
FIG. 5 is a cross-sectional view of a pressure vessel formed in a blow mold according to the present subject matter.
Figure 6:
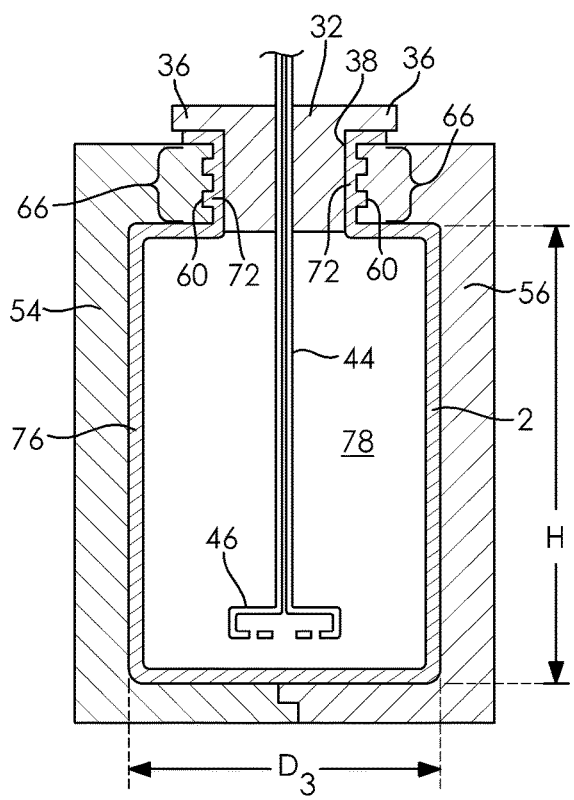
FIG. 6 is a cross-sectional view of another embodiment of a pressure vessel formed in a blow mold according to the present subject matter.

The bung portion 32 may include a flange 36 at a top of the bung portion 32, and a wall 38 extending down from the flange 36. The wall 38 may include an exterior threaded section 42 (FIGS. 3-5) or may be smooth (FIG. 6). The plunger portion 34 may include a hollow extension rod 44 and a hollow distributor head 46 that collectively define a delivery pathway 48 through which pressurized air is delivered to the interior 16 of the preform 4 during the blow molding process (FIGS. 3-6). The distributor head 46 may include apertures 50 through which the pressurized air exits the delivery pathway 48 and is delivered to the interior 16 of the preform 4. The distributor head 46 may have a diameter $D_1$ larger than a diameter $D_2$ of the extension rod 44, such that the pressurized air is spread out before being delivered into the interior 16 of the preform 4 to more evenly expand the preform 4 during blow molding.

The blow pin assembly 30 may be inserted through the opening 20 of the preform 4 so that the preform 4 is arranged on the blow pin assembly 30 (FIG. 2). This may be accomplished by arranging the bung portion 32 inside the opening 20 of the preform 4, such that an interior surface 40 of the preform 4 contacts the wall 38 of the bung portion 32. This may be performed before or after the preform 4 is arranged in a blow mold 52 for subsequent blow molding. Mounting the preform 4 on the blow pin assembly 30 may allow the preform 4 to be transported by the blow pin assembly 30 to be arranged in the blow mold 52. The bung portion 32 may stretch the opening 20 of the preform 4, e.g. by 200% to 300%, during this step.

The blow mold 52 may include a first mold section 54 and a second mold section 56. The preform 4 may be loaded into an interior 62 of the blow mold 52, which interior 62 is formed by mating the first mold section 54 and the second mold section 56 as shown in FIGS. 4-6. When mated, the bottoms of the first and second mold sections 54, 56 may be contacting each other to close off a bottom 64 of the blow mold 52, while the tops of the first and second mold section 54, 56 may form a hole 60. The blow pin assembly 30 may be arranged in the hole 60, such that a portion of the preform 4 is clamped between the blow pin assembly 30 and the hole 60 in the top 62 of the blow mold 52. The clamped portion of the preform 4 is clamped between the hole 60 in the blow mold 52 and the bung portion 32 of the blow pin assembly 4. The clamped portion of the preform 4 is adjacent to the opening 20 in the preform 4, and may include the lip 22 of the preform 4 (which may be clamped between the flange 36 of the bung portion 32 and the hole 60 in the blow mold 56) and a top portion of the preform 4 (which is a portion clamped between the wall 38 of the bung portion 32 and the hole 60 of the blow mold 52).

The hole 60 at the top of the blow mold 52 may be smooth (FIGS. 3-5), or may include an interior threaded section 66 (FIG. 6). The hole 60 may be smooth if the wall 38 of the bung portion 32 includes the exterior threaded section 42 (FIGS. 3-5), and the hole 60 may include the interior threaded section 66 if the wall 38 is smooth (FIG. 6).

After the preform 4 is loaded into the blow mold 52, which may be cooled, the method may include blow molding the preform 4 to form the pressure vessel 2. Blow molding may include extending the plunger portion 34 from the retracted position (FIG. 3) to the extended position (FIG. 4). This extension of the plunger portion 34 acts on the preform 4 to stretch the preform 4 from an initial configuration (FIG. 3) down toward the bottom of the interior 58 of the blow mold 52 to a stretch configuration (FIG. 4). Such extension of the plunger portion 34 to the extended position may be performed while delivering pressurized air through the delivery pathway 48 and into the interior 16 of the preform 4, or may be performed without such delivery of the pressurized air. During stretching of the preform 4 toward the bottom of the blow mold 52, the walls of the preform 4 may be thinned. Thereafter, pressurized air may be introduced into the interior 16 of the preform 4 via the plunger portion 34, to thereby expand the preform 4 from the stretched configuration (FIG. 4) to a blow molded configuration (FIGS. 5-6) to thereby form the pressure vessel 2. In the blow molded configuration, the pressure vessel 2 may be pressed against the inside surface 68 of the blow mold 52. Thus, the pressure vessel 2 takes on the shape of the interior 58 of the blow mold 52.

During the blow molding process, the wall 38 of the bung portion 32 and the hole 60 of the blow mold 52 act on the clamped portion of the preform 4, e.g. by compression molding, to form a neck 70. The rest of the preform 4 may expand to form a tank portion 76 on the pressure vessel 2. The bung portion 32 may stretch the opening 20 of the preform 4, e.g. by 200% to 300%, to form the neck 70. The neck 70 may have either an internal female thread 72 (FIG. 5) or an external male thread 74 (FIG. 6), or no thread. When the bung portion 32 includes the exterior threaded section 42 and the hole 60 is smooth, the bung portion 32 and the hole 60 collectively compression mold the clamped portion of the preform 4 to form the neck 70 with the internal female thread 72 (FIGS. 4-5). When the bung portion 32 is smooth and the hole 60 includes the interior threaded section 66, the bung portion 32 and the hole 60 collectively compression mold the clamped portion of the preform 4 to form the neck 70 with the external male thread 74 (FIG. 6). The blow pin assembly 30 or portions thereof, e.g. the bung portion 32, may be heated during blow molding to thereby allow for the compression molding of the clamped portion of the preform 4. When the bung portion 32 and the hole 60 are smooth, the neck 70 may not include a thread.

The remainder of the preform 4 (i.e. portions other than the clamped portion) may expand within the blow mold 52 to form a tank portion 76 on the pressure vessel 2. The tank portion 76 may define an interior 78 of the pressure vessel 2, and the neck 70 may define an opening to the interior 78 of the pressure vessel 2. Blow molding of the preform 4 to form the pressure vessel 2, may cause the polymer material to become biaxially oriented. The neck 70 (including the internal female thread 72, external male thread 74, or being smooth) and the tank portion 76 of the pressure vessel 2 are integrally formed from the biaxially oriented polymer material.

The blow molding process may be performed while the preform 4 is at or above the $T_g$ of the polymer material. After blow molding the preform 4, the pressure vessel 2 may be cooled to a third predetermined temperature in order to harden the polymer material of the pressure vessel 2 so that the pressure vessel 2 retains the blow molded configuration (FIGS. 5-6). This cooling step may be performed on the pressure vessel 2 when it is still within the interior 58 of the blow mold 52 and while the pressurized air is still being delivered to the interior 78 of the pressure vessel 2. Cooling may be active (subjecting the pressure vessel 2 or blow mold 52 to a cooling agent, e.g. air, liquid, or heat sink) or passive (simply letting the pressure vessel 2 or blow mold 52 to cool in the ambient environment). The third predetermined temperature may be below the glass transition temperature ($T_g$) of the polymer material used to make the pressure vessel 2, and is therefore dependent on the chemical composition of the polymer material used to form the pressure vessel 2. The third predetermined temperature may be ambient temperature.

Post reheating of the pressure vessel 2 may be performed to remove molded-in stresses. Other parts and fitting can be attached to the pressure vessel 2 as is conventional in the art.

The injection molding and blow molding process may be automated, e.g. by using robotic arm tooling for transporting the preform 4 and pressure vessel 2, and automated tooling for injection molding and blow molding.

The size of the pressure vessel 2 is dependent on the blow mold 52 and not particularly limited. The tank portion 76 of the pressure vessel 2 may be in the form of a cylinder. The cylindrical body portion of the pressure vessel preferably has a diameter $D_3$ of at least about 200 mm (~8 inches). Throughout the specification and in the appended claims, unless otherwise denoted, the term "about" means±10% of the stated value. The diameter $D_3$ is preferably not greater than about 300 mm (~12 inches). The cylindrical body portion preferably has a height H of about 900 mm (~35 inches). And, the cylindrical body portion preferably has a height not greater than about 1300 mm (~50 inches). It will be appreciated that these dimension are not to be construed as limiting to the present subject matter, and that the body portion of the pressure vessel can be made having different sizes, if desired.

The biaxially oriented polymer material of the pressure vessel 2 is very strong and may therefore not be prone to uncontrolled rupturing and sharp shards of material being blow about in a large radius as may occur with conventional blow molded and injection molded pressure vessels. The biaxially oriented polymer material of the pressure vessel 2 may have improved impact resistance, and pressure and cyclic capabilities compared to conventional blow molded and injection molded pressure vessels. As such, the biaxially oriented pressure vessel 2 may have improved performance characteristics compared to blow molded and injection molded pressure vessels, and if the pressure vessel 2 ruptures, such rupturing may only produce a hole in the pressure vessel 2. During rupturing, the pressure vessel 2 may remain intact without sharp shards being produced and scattered about, and thus the pressure vessel 2 may have predictable and safe failure modes.

Further, the inventive process may reduce the tooling and machine cost associated with injection molding or blow molding the same size pressure vessels. By first preparing a small preform 4, as opposed to a larger finished injection molded pressure vessel, the present method can use an injection mold 6, press size, and tooling that have significantly lower costs. The blow mold 52 in the present method is a low pressure tool and may require a large platen, but the tonnage required to hold it closed is much lower than an injection mold for producing a large injection molded part. A used injection press with only the hydraulic circuit and clamp section could be repurposed for this post-mold operation.

The blow molding process may result in the walls of the pressure vessel 2 having a uniform thickness, and which may be thinner than the walls of the preform 4. Further, the injection molding and blow molding processes of the present invention may result in at least a portion of the polymer material of the pressure vessel 2 being biaxially molecularly oriented, which makes the polymer material very strong compared to blow molded polymer material and to injection molded polymer material.

Because of the strength of the biaxially oriented polymer material, the walls of the pressure vessel 2 may be thinner than walls of conventional blow molded pressure vessels or injection molded pressure vessels having similar pressure ratings, heights, and/or diameters. Additionally, because of the strength of the biaxially oriented polymer material, the pressure vessel 2 may be one that is not reinforced, i.e. it is free of reinforcing layers that may be required for conventional pressure vessels that are not as strong. That is, the pressure vessel 2 may only be formed of the biaxially oriented polymer material, and may be free of any auxiliary reinforcing layer, e.g. a fiberglass/epoxy composite material or layer applied over an outer surface of the pressure vessel 2. Because auxiliary reinforcing layers are not required, and because less polymer material is needed to form the pressure vessel 2 compared to the thicker walls required in conventional blow molded and injection molded pressure vessels, the cost of producing the instant pressure vessel 2 may be less than these conventional pressure vessels.

It will be appreciated that the above-disclosed and other features and functions, or alternatives or varieties thereof, may be desirably combined into many other different systems or applications.

The invention claimed is:

1. A method of manufacturing a pressure vessel comprising:

heating a preform formed of a thermoplastic polymer to thereby obtain a heated preform;

inserting a blow pin assembly into an opening of the heated preform, wherein the blow pin assembly includes a bung portion and a plunger portion that extends through the bung portion;

clamping the heated preform between the bung portion of the blow pin assembly and sections of a blow mold;

extending the plunger portion of the blow pin assembly into an interior of the heated preform from a first retracted position to a second extended position to stretch the heated preform in the blow mold and thereby obtain a stretched preform; and blowing air into the stretched preform under pressure to form the pressure vessel such that:

(a) the pressure vessel comprises a tank having a neck portion, a cylindrical body portion having a diameter of at least about 200 mm, and a bottom portion, (b) at least the thermoplastic polymer in the cylindrical body portion of the pressure vessel is biaxially oriented, and (c) threads are formed in the neck portion of the pressure vessel, wherein the threads are female threads formed on an inner side of the neck portion of the pressure vessel, and wherein the bung portion includes an exterior threaded section that form the female threads on the neck portion of the pressure vessel in the clamping step.

2. The method according to claim 1, wherein during the heating step the preform is heated by at least one heating element disposed in the interior of the preform and by one or more heating elements facing an exterior of the preform.

3. The method according to claim 1, wherein:

the plunger portion includes a hollow extension rod and a hollow distributor head that collectively define a delivery pathway through which the air is blown into the interior of the preform under pressure;

the distributor head has a diameter larger than a diameter of the extension rod; and the distributor head includes apertures through which the air exits the delivery pathway and is blown into the interior of the preform under pressure.

4. The method according to claim 1, wherein an exterior of the pressure vessel is not subsequently reinforced with a composite glass fiber/epoxy coating after the pressure vessel is formed.

5. The method according to claim 1, wherein the diameter of the cylindrical body portion is not greater than about 300 mm.

6. The method according to claim 1, wherein the cylindrical body portion of the pressure vessel has a height of at least about 900 mm.

7. The method according to claim 1, wherein the height of the cylindrical body portion of the pressure vessel is not greater than about 1300 mm.

8. A pressure vessel formed according to the method of claim 1.

9. The pressure vessel according to claim 8, wherein the threads are female threads formed on an inner side of the neck portion of the pressure vessel.

10. The pressure vessel according to claim 8, wherein the threads are male threads formed on an outer side of the neck portion of the pressure vessel.

11. The pressure vessel according to claim 8, wherein an exterior of the pressure vessel is not reinforced with a composite glass fiber/epoxy coating.

12. The pressure vessel according to claim 8, wherein the diameter of the cylindrical body portion is not greater than about 300 mm.

13. The pressure vessel according to claim 8, wherein the cylindrical body portion of the pressure vessel has a height of at least 900 mm.

14. The pressure vessel according to claim 13, wherein the height of the cylindrical body portion of the pressure vessel is not greater than 1300 mm.

15. A method of manufacturing a pressure vessel comprising:
heating a preform formed of a thermoplastic polymer to thereby obtain a heated preform;
inserting a blow pin assembly into an opening of the heated preform, wherein the blow pin assembly includes a bung portion and a plunger portion that extends through the bung portion;
clamping the heated preform between the bung portion of the blow pin assembly and sections of a blow mold;
extending the plunger portion of the blow pin assembly into an interior of the heated preform from a first retracted position to a second extended position to stretch the heated preform in the blow mold and thereby obtain a stretched preform; and
blowing air into the stretched preform under pressure to form the pressure vessel such that:
(a) the pressure vessel comprises a tank having a neck portion, a cylindrical body portion having a diameter of at least about 200 mm, and a bottom portion,
(b) at least the thermoplastic polymer in the cylindrical body portion of the pressure vessel is biaxially oriented, and
(c) threads are formed in the neck portion of the pressure vessel,
wherein:
the plunger portion includes a hollow extension rod and a hollow distributor head that collectively define a delivery pathway through which the air is blown into the interior of the preform under pressure;
the distributor head has a diameter larger than a diameter of the extension rod; and
the distributor head includes apertures through which the air exits the delivery pathway and is blown into the interior of the preform under pressure.

16. The method according to claim 15, wherein the threads are female threads formed on an inner side of the neck portion of the pressure vessel.

17. The method according to claim 16, wherein the bung portion includes an exterior threaded section that form the female threads on the neck portion of the pressure vessel in the clamping step.

18. The method according to claim 15, wherein the threads are male threads formed on an outer side of the neck portion of the pressure vessel.

19. The method according to claim 18, wherein the sections of the blow mold includes an interior threaded section that forms the male threads on the neck portion of the pressure vessel in the clamping step.

20. The method according to claim 15, wherein during the heating step the preform is heated by at least one heating element disposed in the interior of the preform and by one or more heating elements facing an exterior of the preform.

21. The method according to claim 15, wherein an exterior of the pressure vessel is not subsequently reinforced with a composite glass fiber/epoxy coating after the pressure vessel is formed.

22. The method according to claim 15, wherein the diameter of the cylindrical body portion is not greater than about 300 mm.

23. The method according to claim 15, wherein the cylindrical body portion of the pressure vessel has a height of at least about 900 mm.

24. The method according to claim 15, wherein the height of the cylindrical body portion of the pressure vessel is not greater than about 1300 mm.

25. A pressure vessel formed according to the method of claim 15.

26. The pressure vessel according to claim 25, wherein the threads are female threads formed on an inner side of the neck portion of the pressure vessel.

27. The pressure vessel according to claim 25, wherein the threads are male threads formed on an outer side of the neck portion of the pressure vessel.

28. The pressure vessel according to claim 25, wherein an exterior of the pressure vessel is not reinforced with a composite glass fiber/epoxy coating.

29. The pressure vessel according to claim 25, wherein the diameter of the cylindrical body portion is not greater than about 300 mm.

30. The pressure vessel according to claim 25, wherein the cylindrical body portion of the pressure vessel has a height of at least 900 mm.

31. The pressure vessel according to claim 25, wherein the height of the cylindrical body portion of the pressure vessel is not greater than 1300 mm.

* * * * *